United States Patent [19]

Yong

[11] Patent Number: 4,833,746
[45] Date of Patent: May 30, 1989

[54] PORTABLE MUTIFUNCTIONAL DEVICE FOR MOTOR VEHICLES

[75] Inventor: Chin S. Yong, Seoul, Rep. of Korea

[73] Assignee: Chung Yang Company, Ltd., Seoul, Rep. of Korea

[21] Appl. No.: 133,530

[22] Filed: Dec. 16, 1987

[51] Int. Cl.⁴ .............................................. B25F 3/00
[52] U.S. Cl. ........................................ 7/100; 7/138; 7/158; 7/170
[58] Field of Search ................... 7/100, 170, 138, 158; 310/47, 50, 83; 254/DIG. 2, 93 H, DIG. 4, 122; 81/57.11, 57

[56] References Cited

U.S. PATENT DOCUMENTS

| 979,143 | 12/1910 | Faure | 310/50 |
| 3,821,902 | 7/1974 | Dubois | 310/50 |
| 3,977,278 | 8/1976 | Jackson | 81/57.11 |
| 4,653,727 | 3/1987 | Chang | 254/DIG. 2 |
| 4,706,937 | 11/1987 | Chung | 254/93 H |
| 4,749,169 | 6/1988 | Pickles | 254/DIG. 4 |

FOREIGN PATENT DOCUMENTS 1357007  6/1974  United Kingdom ............... 81/57.11

Primary Examiner—Roscoe V. Parker
Attorney, Agent, or Firm—Birch, Stewart, Kolasch & Birch

[57] ABSTRACT

A portable multifunctional device for motor vehicles which includes a motor driven by an electric power source from the cigarette light socket of a motor vehicle. The motor has a high-speed revolution shaft for being operatively connected to a vacuum cleaner or the like, a low-speed revolution shaft having a reduction gear for being operatively connected to a jack or the like, and a cap for covering at least one shaft.

2 Claims, 3 Drawing Sheets

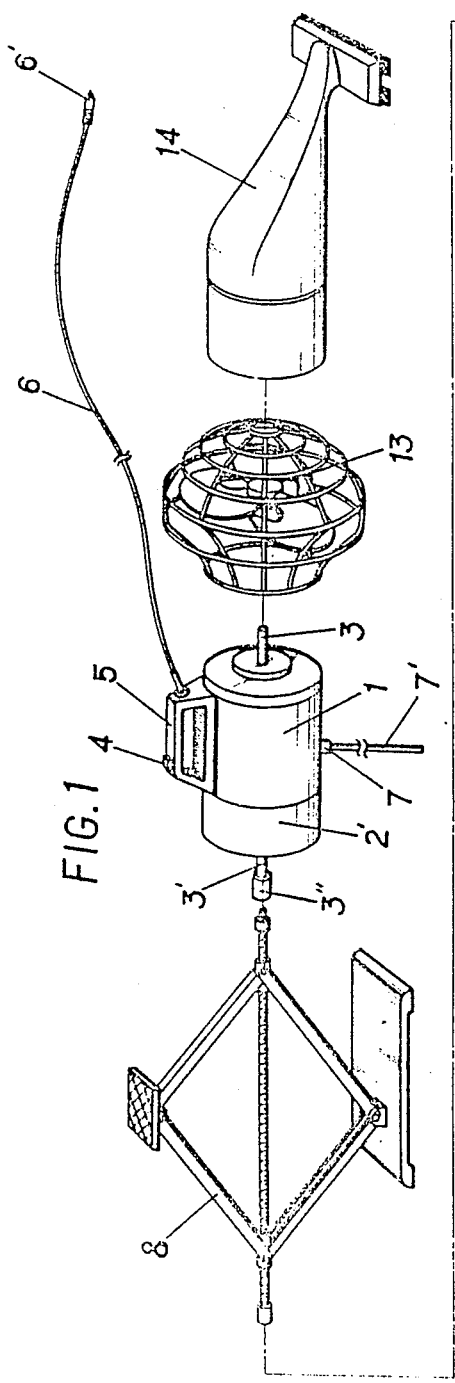
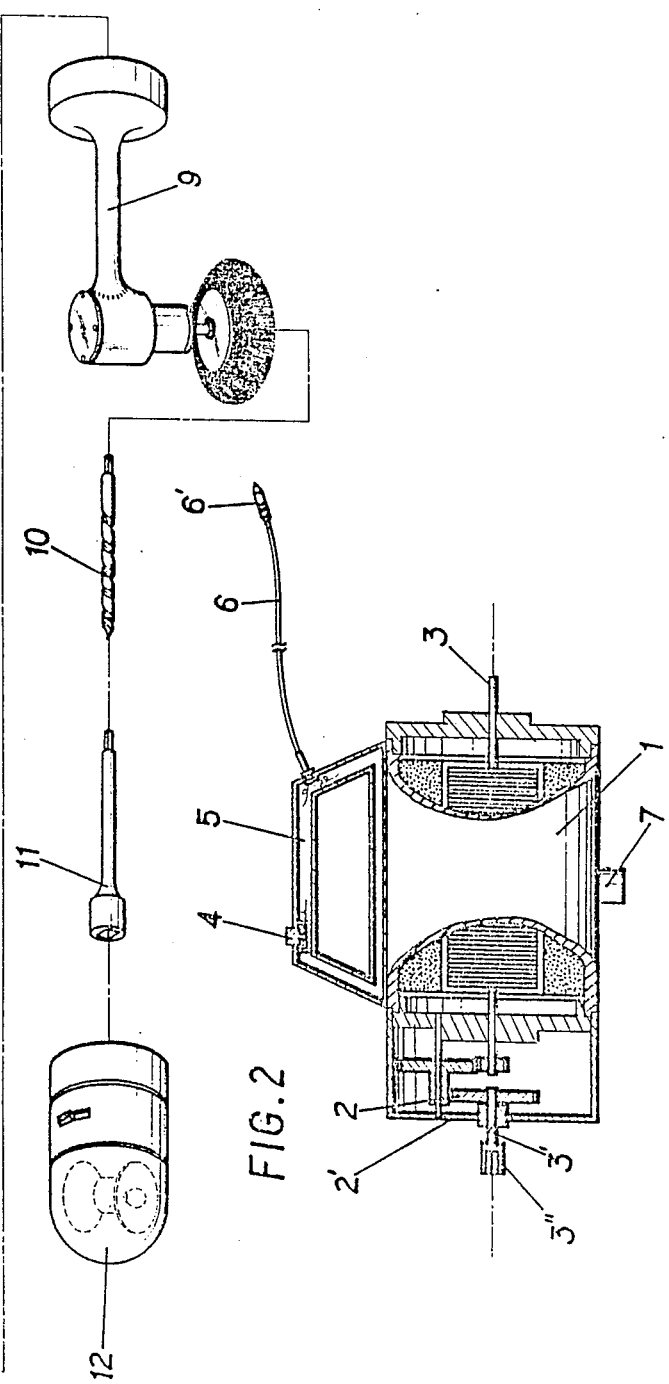

PORTABLE MUTIFUNCTIONAL DEVICE FOR MOTOR VEHICLES

BACKGROUND OF THE INVENTION

1. Field of the Invention

The present invention relates to a multi-purpose device for use in motor vehicles.

More particularly, the present invention relates to a convenience device including a DC motor being operated by a 12 V DC battery disposed in a motor vehicle which is coupled a high-speed revolution shaft operatively connected to a fan for blowing air or a vaccum cleaner for removing filths in the vehicle and a low-speed revolution shaft operatively connected to a jack, a duster, a drill, a box spanner or a signal light to the convenience of 1 vehicle operation.

2. Description of the Prior Art

According to the conventional devices, when a car happens to break down in operation on road, the driver usually relies on hand-operated tools to do repair works. Also, in the event of cleaning, dusting or polishing the inside and outside of a car, unsanitary cloths or the like are utilized to take a long time.

SUMMARY OF THE INVENTION

Accordingly, it is an object of the present invention to provide an improved multifunctional device for motor vehicles.

Another object of the present invention is to provide a DC motor device driven by an electric power source from the cigarette light socket of a motor vehicle which includes a high-speed revolution shaft for being operatively connected to a vacuum cleaner or the like and a low-speed revolution shaft having a reduction gear for being operatively connected to a jack or the like.

A further object of the present invention is to provide a portable multifunctional device including a cap for covering at least one revolution shaft thereof.

Briefly described, the present invention relates to a portable multifunctional device for motor vehicles which includes a motor driven by an electric power source from the cigarette light socket of a motor vehicle. The motor has a high-speed revolution shaft for being operatively connected to a vacuum cleaner or the like, a low-speed revolution shaft having a reduction gear for being operatively connected to a jack or the like, and a cap for covering at least one shaft.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is an exploded, perspective view of a portable multifunctional device of the present invention;

FIG. 2 is a front view of a motor of the device of the present invention showing cut away portions thereof;

DESCRIPTION OF THE PREFERRED EMBODIMENT

Figure 3A:
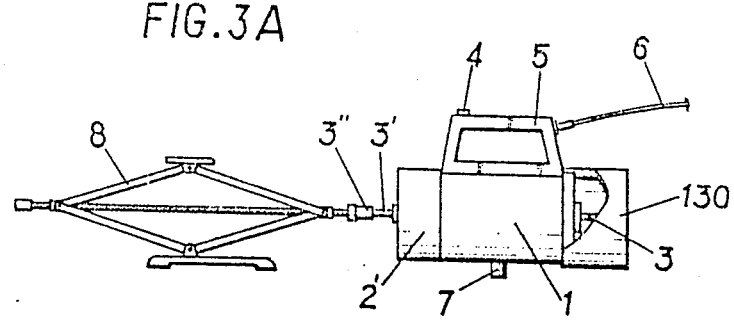
FIGS. 3(A) and (B) are a front view of the device of the present invention utilizing a jack.
Figure 3B:
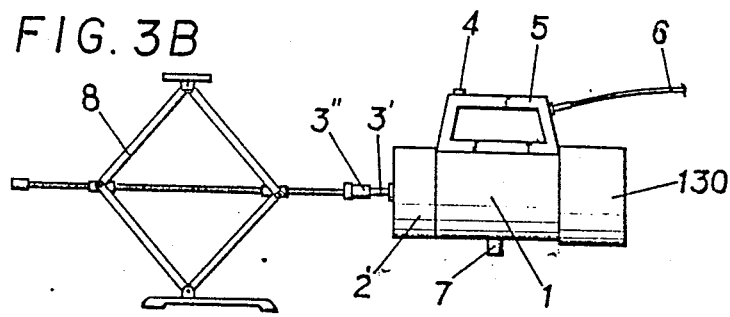

As shown in FIGS. 1 and 2, a DC motor 1 is connected to a vehicle 101 by means of a cord 6 having a plug 6' which is detachably inserted into a cigarette lighter socket of the vehicle and is provided with a hand grip 5 having a power switch 4 on the top of the grip 5. The DC motor 1 is driven by the electric power source from the cigarette lighter socket. The DC motor 1 is provided with one high-speed revolutionary shaft 3 and the other high speed revolutionary shaft 3 which is mount to a reduction gear member 2 covered by a detachable cap 2'. A low-speed revolutionary shaft 3' of the reduction gear member 2 is provided, at its free end, with a slip joint 3" for being integrally formed with a shaft to be detachable coupled, if necessary, with a jack 8 for lifting the vehicle, a duster 9 for cleaning and polishing the vehicle, a drill 10 for making holes, a box spanner 11 for tightening or loosening bolts and nuts, or a signal light for warning on a vehicle having a problem on the road. Further, a fan 13 for ventilating air in the vehicle or a vacuum cleaner 14 for removing filths on the inside floor is coupled with the high speed shaft 3 as required. The other side of the motor shaft when one side of the motor shaft is coupled with one member of the above-mentioned detachable members is detachably capped with a cover 130 to seal and protect the motor 1 from exterior objects. In the event of using the drill 1 or box spanner 11, a support bar 7' is slip-joined into a slip joint socket 7 that is integrally formed with a motor housing on its outer surface to solidly support the motor.

The device including attachments of the present invention is carried in the vehicle for unexpected troubles on the road. At this time, the plug 6' of the cord 6 connected to the motor 1 is plugged into the cigarette lighter socket in the vehicle 101 and at least one attachment is coupled with at least one motor shaft if necessary.

The operation of the device of the present invention is explained as follows:

EXAMPLE 1

FIGS. 3(A) and (B) show an embodiment utilizing the jack 8 for replacing a flat tire of a car. In the event, the jack 8 is coupled with the low-speed shaft 3' of the motor 1 by slip-joining an end of a jack shaft into the slip joint 3" disposed at the end of the shaft 3'. Puting on the switch 4, the motor 1 rotates the jack shaft to actuate the jack up and down by the action of its screw for replacing a flat tire or the like.

EXAMPLE 2

Figure 5:
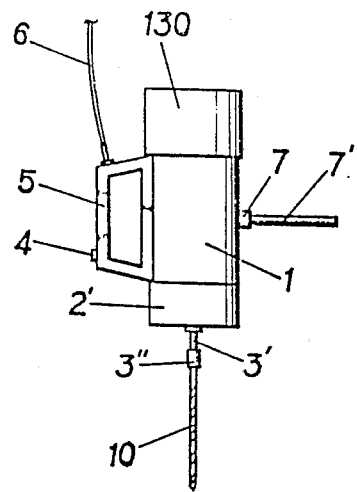
FIG. 5 is a front view of the device of the present invention utilizing a drill.

Referring to FIG. 5, the drill 10 is slip-joined into the joint socket 3" of the shaft 3' of the motor 1, and a support bar 7' is slipped into the slip joint socket integrally formed with the motor housing. Then, with one hand holding hand grip 5 on the motor 1 and with the other firmly holding the bar 7', the switch botton is put on to start the motor 1 to drive the drill 10 for making a hole as required.

EXAMPLE 3

Figure 6:
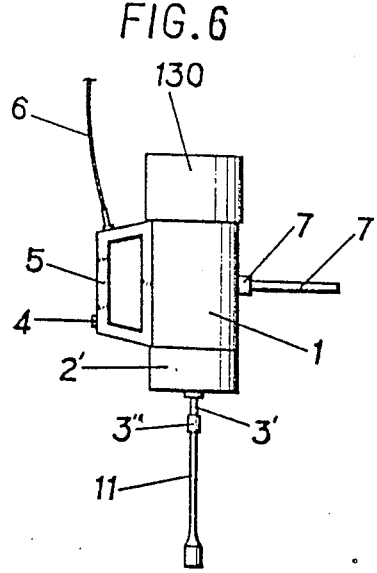
FIG. 6 is a front view of the device of the present invention utilizing a box spacer.

Referring to FIG. 6, the box spanner 11 is slip joined into the slip joint socket 3" of the low-speed revolutionary shaft 3' to rotate with the shaft and the support bar 7' for is joined into the joint socket 7 being integral with the motor housing to firmly support the motor 1. In the event of tightening or loosening bolts or nuts, the box spanner 11 is fitted over the targeted bolt head or nut and the motor 1 is switched on to screw or unscrew the bolt or nut while holding the hand grip 4 with one hand and the bar 7' with the other with ease and swiftness.

EXAMPLE 4

Figure 7:
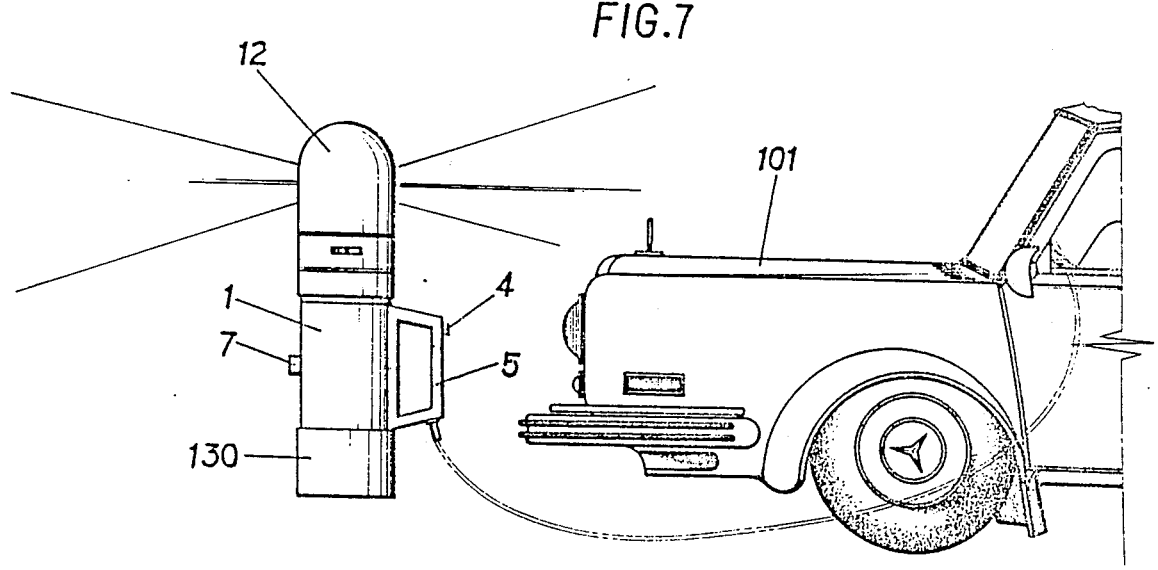
FIG. 7 is a front view of the device of the present invention utilizing a signal light.

Referring to FIG. 7, the signal light 12 is joined onto the low speed shaft 3' of the motor 1 for use of giving warning signals on a troubled car on the road. Upon switching on, the light revolves in one direction and gives blinking lights to signal a warning about a car in breakdown on the road to prevent any possible accident.

EXAMPLE 5

Figure 4:
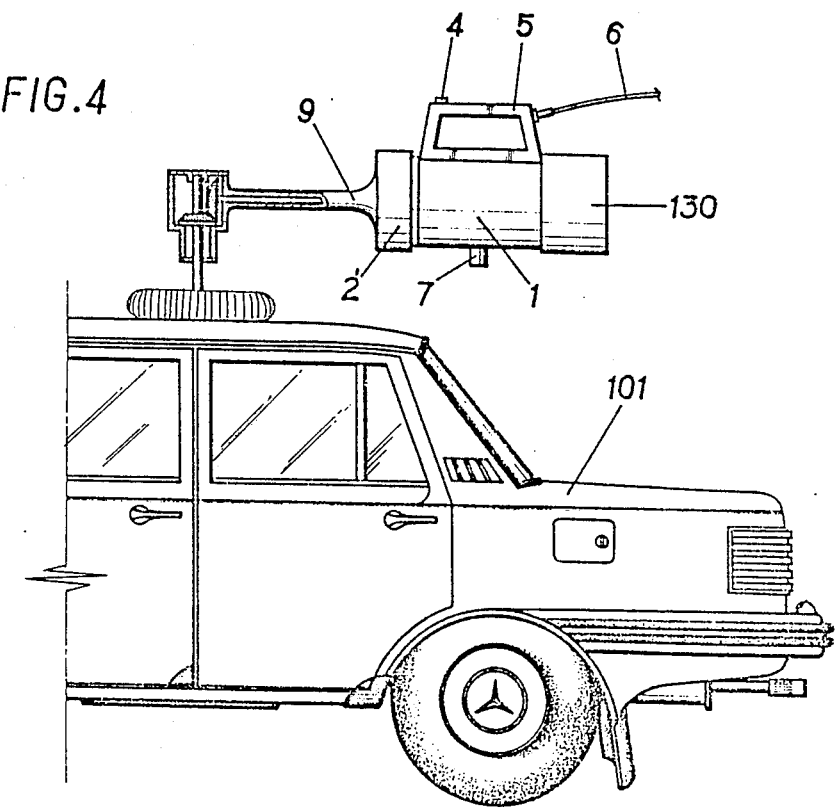
FIG. 4 is a front view of the device of the present invention coupled to a duster for polishing.

Referring to FIG. 4, the duster 9 having a cloth brush and being coupled with the low speed revolution shaft 3' by means of the slip joint 3". The motor 1 is operated for the duster 9 makes a fast and efficient work of dusting dirt off and polishing the surface of the car body.

EXAMPLE 6

The fan 13 is coupled with the high speed revolutionary shaft 3 of the motor 1 to blow air for cooling a heated engine or supply fresh air for the inside of the car.

PREFERRED EMBODIMENT 7

The Example 7 vaccum cleaner 14 is coupled with the high-speed shaft 3 of the motor 1 for the purpose of cleaning filths and trashes from the inside of the car by means of its efficient suction pump.

As explained above, the of the present invention is arranged to be plugged into a cigarette lighter socket disposed in the car for multi-purposes by utilizing the jack, duster, drill, box spanner, signal light, fan and/or vacuum cleaner. The attachments are selected if necessary and easily attached onto the low speed or high-speed shaft of the motor 1 for handy and efficient operation and maintenance for the vehicles.

What is claimed is:

1. A portable multifunctional device for motor vehicles comprising:
   a DC motor having a motor housing and a motor shaft and being operatively connected to a power cord having at one end a plug for being plugged into a cigarette lighter socket of said motor vehicle,
   a hand grip having a switch for power on the top of said grip being attached to said motor housing,
   a slip joint disposed on said motor housing for slidably holding a support bar,
   a high speed revolutionary shaft arranged at a first end of said motor shaft for being operatively attached to a vacuum cleaner for cleaning the interior of said motor vehicle or to a fan for ventilating the interior of said motor vehicle,
   a reduction gear means operatively engaged with the second end of said motor shaft for lowering the rotational speed of said motor shaft, said reduction gear means including a low speed revolution shaft connected thereto for being operatively connected to a jack for lifting or lowering the body of said motor vehicle, and
   a detachable cap for slidably capping at least one end of said motor shaft when it is not in use for protection, whereby the portable multifunctional device can be carried in the vehicle.

2. The portable multifunctional device of claim 1, wherein said high speed revolutionary shaft is adapted to be operatively connected to an attachment selected from the group consisting of a duster for cleaning and polishing the vehicle, a drill for making holes, a box spanner for tightening or loosening bolts and nuts, and a signal light for warning other vehicles.

* * * * *